United States Patent
Yang et al.

(10) Patent No.: US 8,599,950 B2
(45) Date of Patent: Dec. 3, 2013

(54) METHOD AND DEVICE FOR CYCLIC DELAY MAPPING FOR THE SIGNAL IN THE MULTI-ANTENNA TRANSMITTER

(75) Inventors: Hongwei Yang, Shanghai (CN); Xiaolong Zhu, Shanghai (CN)

(73) Assignee: Alcatel Lucent, Paris (FR)

( * ) Notice: Subject to any disclaimer, the term of this patent is extended or adjusted under 35 U.S.C. 154(b) by 388 days.

(21) Appl. No.: 12/863,222

(22) PCT Filed: Jan. 17, 2008

(86) PCT No.: PCT/CN2008/000123
§ 371 (c)(1),
(2), (4) Date: Jul. 16, 2010

(87) PCT Pub. No.: WO2009/089656
PCT Pub. Date: Jul. 23, 2009

(65) Prior Publication Data
US 2010/0309999 A1    Dec. 9, 2010

(51) Int. Cl.
*H04B 7/02* (2006.01)

(52) U.S. Cl.
USPC ........... 375/267; 375/260; 375/259; 375/295; 375/316

(58) Field of Classification Search
USPC ......................... 375/260, 267, 259, 295, 316
See application file for complete search history.

(56) References Cited

U.S. PATENT DOCUMENTS

| | | | |
|---|---|---|---|
| 7,729,432 B2 * | 6/2010 | Khan et al. .................. | 375/260 |
| 7,978,780 B2 * | 7/2011 | Azizi et al. ................... | 375/267 |
| 8,073,068 B2 * | 12/2011 | Kim et al. ..................... | 375/267 |
| 8,131,228 B2 * | 3/2012 | Liao et al. .................... | 455/101 |
| 8,374,276 B2 * | 2/2013 | Hoshino et al. ............... | 375/267 |
| 2004/0042390 A1 | 3/2004 | Celebi et al. | |
| 2005/0281240 A1 * | 12/2005 | Oh et al. ........................ | 370/343 |
| 2007/0041457 A1 * | 2/2007 | Kadous et al. ................. | 375/260 |
| 2008/0247364 A1 * | 10/2008 | Kim et al. ..................... | 370/336 |
| 2008/0267318 A1 * | 10/2008 | Ihm et al. ...................... | 375/299 |
| 2008/0303701 A1 * | 12/2008 | Zhang et al. .................. | 341/106 |
| 2009/0005120 A1 * | 1/2009 | Ylitalo ........................ | 455/562.1 |
| 2009/0147865 A1 * | 6/2009 | Zhang et al. .................. | 375/259 |
| 2010/0317382 A1 * | 12/2010 | Lee et al. ...................... | 455/501 |

FOREIGN PATENT DOCUMENTS

| | | |
|---|---|---|
| CN | 1728616 A | 2/2006 |
| CN | 1801665 A | 7/2006 |
| WO | WO 2007/024913 A1 | 3/2007 |

OTHER PUBLICATIONS

International Search Report for PCT/CN2008/000123.
Alamouti, S., "A simple Transmit Diversity Technique for Wireless Communications", IEEE Journal on Select Areas in Communications, vol. 16, No. 8, 1998, p. 1451-1458.
Draft IEEE Standard for Local and Metropolitan area networks. "Part 16: Interface for Fixed and Mobile Broadband Wireless Access Systems", IEEE P802, 16e/D12, Oct. 2005, p. 1-684.

(Continued)

*Primary Examiner* — Kenneth Lam
(74) *Attorney, Agent, or Firm* — Fay Sharpe, LLP

(57) ABSTRACT

A method of carrying out cyclic delay mapping, wherein, the CDD-like transmitter generate multiple branches of signals corresponding to the multiple transmitting antennas with varying cyclic delay mapping rules, so as to make the cyclic delay parameter, corresponding to at least one of the multiple transmitting antennas, vary as time goes by, in order to prevent the system performance from degrading as time goes by.

13 Claims, 9 Drawing Sheets

(56) References Cited

OTHER PUBLICATIONS

Foschini, G. "Layered Space-Time Architecture for Wireless communication in a Fading Environment When using Multi-Element Antennas" Bell Labs Technical Journal, Autumn 1996, pp. 41-59.
Motorola. "EUTRA Downlink MIMO Requirements and Design", 3GPP TSG RAN WG1 #42, R1-050715, Aug. 29-Sep. 2, 2005, pp. 1-8.
Samsung Electronics Co., Ltd. "Enhanced Frequency Diversity and Scheduling Performance in Evolved UTRA", 3GPP TSG RAN WG1 Meeting #42, R1-050888 Aug. 29-Sep. 2, 2005, pp. 1-16.
Samsung. "Further details on Adaptive Cyclic Delay Diversity Scheme", 3GPP TSG WG1 Meeting #42bis, R1-051046, Oct. 10-14, 2005, p. 1-8.
Etri. "Proposal for Downlink MIMO Transmission Schemes in E-UTRA", 3GPP TSG RAN WG1 Meeting #43, R1-051375, Nov. 7-11, 2005, p. 1-6.
Motorola. "Cyclic Shift Diversity for E-UTRA Control Channels & TP" 3GPP TSG RAN WG1 LTE Adhoc, Jan. 23-25, 2006, TSGRI Adhoc (06)0011, p. 1-5.
Etri. "Combined spatial multiplexing and CSD transmission for rate 2 with 4 transmit antennas" 3GPP TSG RAN WG1 Meeting #44bis, R1-060824, Mar. 27-31, 2006, p. 1-6.
Nortel. "Performance evaluation of downlink open loop schemes for 2 and 4-branch LTE" 3GPP TSG RAN Working Group 1 Meeting #46, R1-062147, Aug. 28-Sep. 1, 2006, p. 1-16.
Alcatel. "Performance evaluations of STBC/SFBC schemes in E-UTRA Uplink", 3GPP TSG RAN WG1 Meeting #45, R1-06-1122, May 8-12, 2006, p. 1-6.

\* cited by examiner

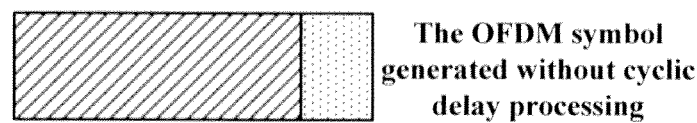
FIG. 2a The OFDM symbol generated without cyclic delay processing
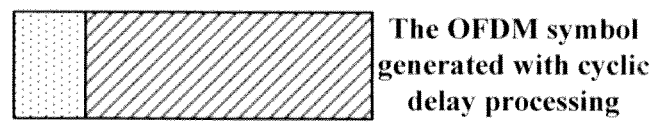
FIG. 2b The OFDM symbol generated with cyclic delay processing
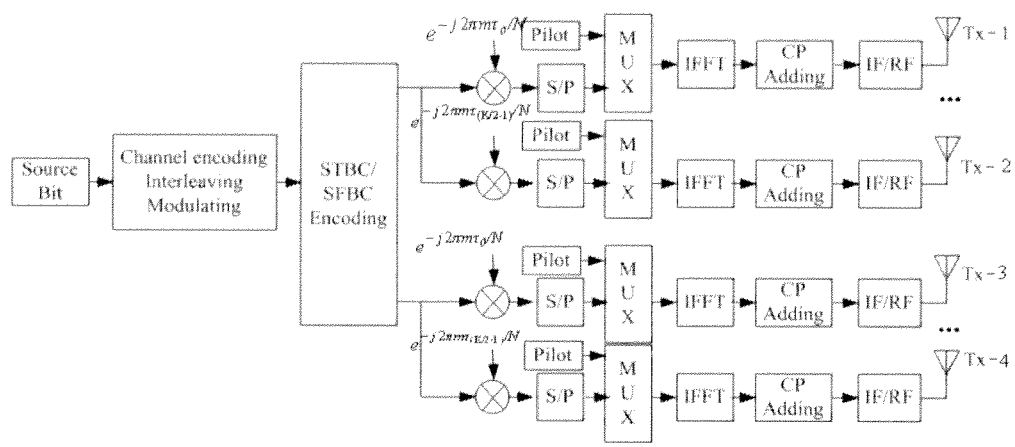
FIG. 3

METHOD AND DEVICE FOR CYCLIC DELAY MAPPING FOR THE SIGNAL IN THE MULTI-ANTENNA TRANSMITTER

FIELD OF THE INVENTION

The invention relates to wireless telecommunication, and particularly to method and corresponding device for cyclic delay mapping for the signal in the multi-antenna transmitter.

BACKGROUND OF THE INVENTION

The OFDM, OFDMA and SC-FDMA systems (we call them OFDM-like systems) are the most important air interface techniques for WiMAX and 3GPP LTE downlink and uplink. The advantages of these radio transmission techniques depend upon their capability to efficiently exploit frequency-diversity.

It is well known for those skilled in the art that the diversity gain is heavily dependent upon the channel environment. For example, no frequency-diversity can be realized in flat-fading channels. Moreover, narrow band systems like 1.25 MHz and 2.5 MHz usually experience relatively smaller frequency selectivity for a given channel scenario. This is due to the fact that the channel coherence bandwidth is determined by the user channel delay spread. In other cases, Rician Channel may also occur in some cases in macro-cell deployments, resulting in a non-frequency selective channel.

Therefore, the industry realizes that through artificially introducing frequency diversity into OFDM-like systems, the performance of the OFDM-like system can be improved significantly.

To be specific, the cyclic delay diversity (CDD) concept is proposed for the wireless telecommunication systems such as OFDM-type systems. References are made to FIG. 1a and FIG. 1b, which show the physical layer transmission structure for realizing CDD in time domain and frequency domain respectively. Since the processing for the signal in time domain is equivalent to that in frequency domain, to be specific, a delay $\tau$ in the time domain is equivalent to a phase shift in the frequency domain, the frequency domain scenario shown in FIG. 1b is taken as an example to illustrate the principle for CCD. After the source bit is processed by the traditional channel encoding, interleaving and modulation, the obtained four same branch of modulated symbols undergoes four kind of cyclic delay processing, i.e., the cyclic delay parameters $e^{-j2\pi\tau_0/N}$, $e^{-j2\pi\tau_1/N}$, $e^{-j2\pi\tau_2/N}$, $e^{-j2\pi\tau_3/N}$, which are determined based on the known channel environment, are used to carry out the phase shift process on the four branches of the same symbols, so as to obtain four branches of symbols after cyclic delay processing. Then, similar to the traditional OFDM-like system, after manipulations such as pilot insertion, IFFT (Inverse Fast Fourier Transform), insertion of Cyclic Prefix and frequency conversion, the signals to be sent are sent by the four transmitting antennas.

Reference are made to FIGS. 2a and 2b to describe the meaning of cyclic delay processing, wherein, for the easy of description, assume that the OFDM symbol is composed of a first part, shown by lines, and a second part, shown by dots, in FIG. 2a. Those skilled in the art can understand, the above assumption serves for the ease of the description for the meaning of cyclic delay processing, and does not serve as limitation to the OFDM symbols in the present invention.

According to general OFDM-like system, in the scenario that no cyclic delay is carried out to the signals to be processed (i.e., the modules to carry out phase shift process to the signals with cyclic delay parameters $e^{-j2\pi\tau_0/N}$; $e^{-j2\pi\tau_1/N}$; $e^{-j2\pi\tau_2/N}$ in FIG. 1b does not exist), the OFDM symbols after IFFT transform are shown as FIG. 2a.

According to the OFDM-like transmitter shown in FIG. 1b, the signals after cyclic delay processing then undergo IFFT transform, and then the OFDM symbols shown in FIG. 2b are obtained. Different from what is shown in FIG. 2a, the second part with dots is shifted to the place prior to the first part with lines. Therefore, the frequency selectivity is introduced, and when deep fading occurs, not all the sub-carriers of the OFDM symbols are in the state of deep fading, which is advantageous to the channel encoding and decoding, thus the robustness of the system is improved.

Based on the idea of introducing frequency selectivity by cyclic delay processing, in order to obtain the Space-Time codes gain at the same time, the CDD solution can be combined with the STBC/SFBC (space-time block code/space-frequency block code). FIG. 3 shows a physical layer transmission structure in the CDD+STBC system. Wherein, the two branches of signals after space-time/space-frequency coding are respectively processed by the cyclic delay parameters $e^{-j2\pi\tau_0/N}$ and $e^{-j2\pi\tau_1/N}$, in order to generate four branches of signals after cyclic delay processing, with two branches for each branch of the signals after the space time/space frequency process. The subsequent processes are the same as that in FIG. 1b, which are omitted for simplicity.

In multi-antenna system, the space multiplexing (SM) technique can be used to obtain gain in data rate. However, when the channel environment becomes worse, the gain obtained by the simple SM technique can not be maximized. In order to solve the problem, the SM can be combined with the above CDD solution, the specific example of which is shown in FIG. 4.

In the present invention, the multi-antenna system with solely CDD is called CDD system for simplicity, and the transmitter therein is called a CDD transmitter; the system combined CDD and STBC is called CDD+STBC system, and the transmitter therein is called CDD+STBC transmitter; the system combined CDD and SM is called CDD+SM system, and the transmitter therein is called CDD+SM transmitter. Besides, the CDD system, the CDD+STBC system and the CDD+SM system are generally called CDD-like system, and the corresponding CDD transmitter, the CDD+STBC transmitter and the CDD+SM transmitter are generally called CDD-like transmitter.

In the existing CDD-like system, the cyclic delay parameters (for example $\tau_0 \ldots \tau_3$ shown in FIG. 1a, $e^{-j2\pi\tau_0/N}$; $e^{-j2\pi\tau_1/N}$; $e^{-j2\pi\tau_2/N}$; $e^{-j2\pi\tau_3/N}$ shown in FIG. 1a, etc), which is used to carry out cyclic delay processing on the signals to be processed, are time-invariant. That is to say, take FIG. 1b as an example, the signal sent by the antenna TX_1 is the signal which is cyclic delay processed by the $e^{-j2\pi\tau_0/N}$, and the signal sent by the antenna TX_2 is the signal which is cyclic delay processed by the $e^{-j2\pi\tau_1/N}$ (analogies can be made to other antennas, for which are omitted).

However, since CDD-like system is sensitive to inter-antenna spatial correlation and the inter-antenna spatial correlation is dependent on the distance between the antennas and some time-variant values, such as angle of arrival, angle spread, it is difficult to predefine a group of cyclic delay parameters that enables the system to always exhibit a good performance in the constantly varied wireless channel environment. Usually, in the CDD-like systems using the above time-invariant cyclic delay parameter, the system performance deteriorates with the time passes by.

SUMMARY OF THE INVENTION

In order to solve the above problem in the prior art, one object of the invention is to provide a new solution, wherein the CDD-like transmitter uses varying cyclic delay mapping rules to generate multiple branches of signals corresponding to multiple transmitting antennas, so that the cyclic delay parameter corresponding to at least one of the multiple transmitting antennas is time-variant; therefore the situation, in which the system performance is degraded with time passing by, is avoided.

In order to realizing the above object, according to a first aspect of the invention, there is provided a method, in a multi-antenna transmitter in a multi-carrier modulation based network device, of carrying out cyclic delay mapping processing on signals, comprising: carrying out cyclic delay mapping processing on the multiple branches of signals to be processed with varying cyclic delay mapping rules, so as to generate multiple branches of signals after cyclic delay mapping processing corresponding to multiple transmitting antennas of said transmitter respectively.

According to the second aspect of the invention, there is provided a first processing device, in a multi-antenna transmitter in a multi-carrier modulation based network device, for carrying out cyclic delay mapping processing on signals, which carries out cyclic delay mapping process on the multiple branches of signals to be processed with varying cyclic delay mapping rules, so as to generate multiple branches of signals after cyclic delay mapping processing respectively corresponding to multiple transmitting antennas of said transmitter.

With the application of the method and device provided by the present invention, at least one of the multiple branches of signals corresponding to multiple transmitting antennas uses varying cyclic delay mapping parameters, so as to improve the robustness of the system. Especially for the correlated channel, the present invention can obtain more gain than that of the prior art under same conditions.

BRIEF DESCRIPTION OF THE DRAWINGS

Other features, objects and advantages of the present invention will become more apparent from reading the following detailed description of the non-limiting embodiments together with the accompany drawings.

FIG. 2a shows an illustrative view of the OFDM symbol without cyclic delay processing;

FIG. 2b shows an illustrative view of the OFDM symbol with cyclic delay processing;

FIG. 3 shows the physical layer architecture of the transmitter of the existing CDD+STBC system;

Wherein, same or similar reference signs represent same or similar means (module) or step features.

DETAILED EMBODIMENT OF THE INVENTION

As mentioned above, the CDD-like systems typically comprise CDD system, CDD+STBC system and CDD+SM system. However, those skilled in the art can understand that, the CDD technique can be combined with other MIMO (Multiple Input Multiple Output) technique such as spatial diversity, and the invention is also applicable to these situations based on the basic idea of the invention.

Figure 5:
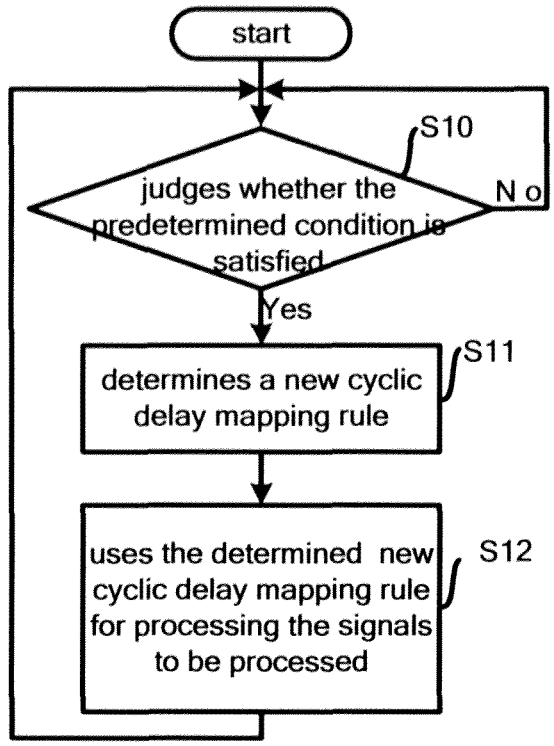
FIG. 5 shows a flowchart of the method, in the multi-antenna transmitter in a multi-carrier modulation based network device, of carrying out cyclic delay processing for the signal according to a detailed embodiment of the present invention.

FIG. 5 shows a flowchart of the method, in the multi-antenna transmitter in a multi-carrier modulation based network device, of carrying out cyclic delay processing for the signal according to a detailed embodiment of the present invention. References are made to the flowchart shown in FIG. 5 and the physical layer structure of the transmitter in each embodiments of the present invention to describe the present invention in details. Wherein, transmitter with four transmitting antennas is taken as an example, and those skilled in the art can apply the present invention to the transmitter with any amount of multiple transmitting antennas, with the following description of the four-antenna transmitter without creative work.

Figure 1A:
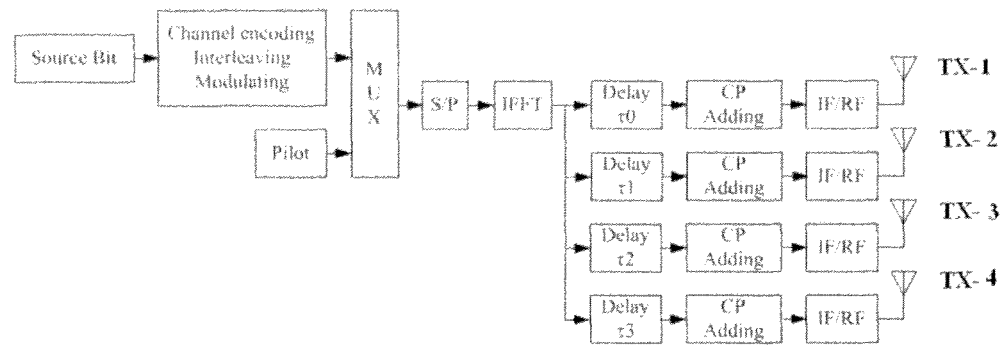
FIG. 1a shows the physical layer architecture of the transmitter with the CDD implemented in the time domain in the prior art.
Figure 1B:
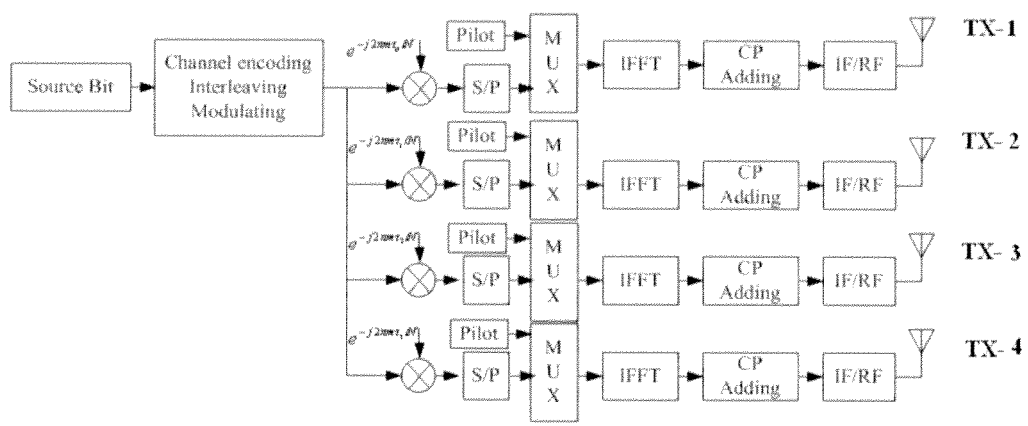
FIG. 1b shows the physical layer architecture of the transmitter with the CDD implemented in the frequency domain in the prior art.
Figure 4:
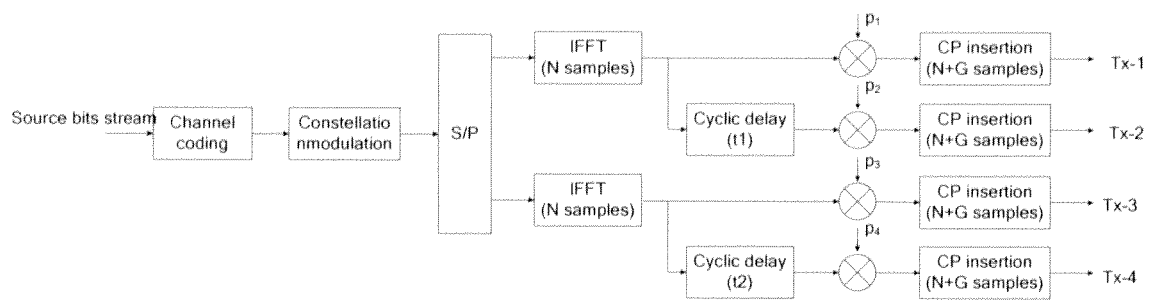
FIG. 4 shows the physical layer architecture of the transmitter of the existing CDD+SM system.
Figure 6A:
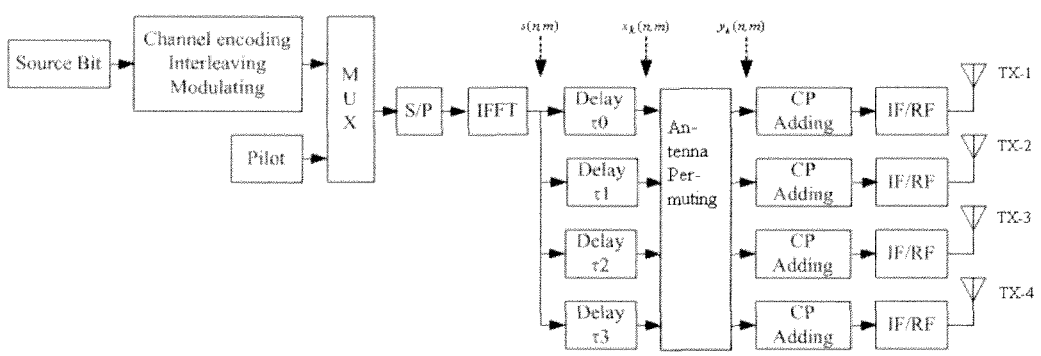
FIG. 6a shows the physical layer architecture of the transmitter with the CDD implemented in the time domain according to a detailed embodiment of the present invention.
Figure 6B:
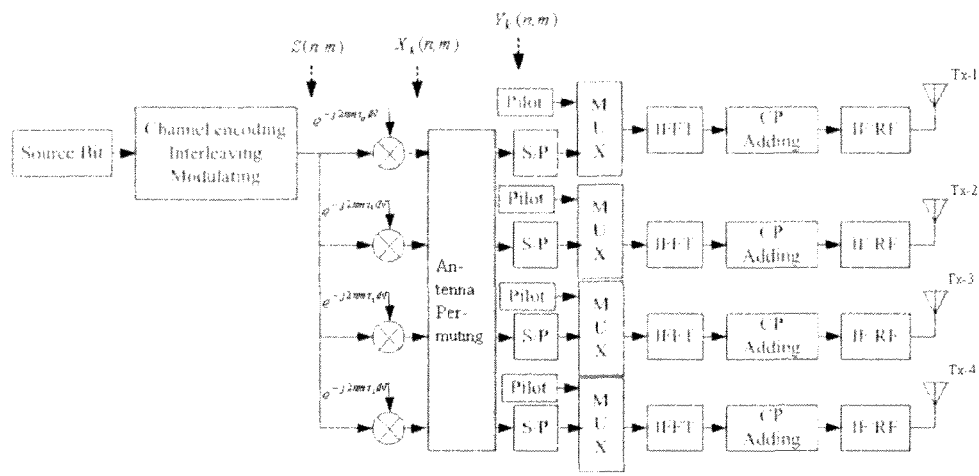
FIG. 6b shows the physical layer architecture of the transmitter with the CDD implemented in the frequency domain according to a detailed embodiment of the present invention.

FIGS. 6a and 6b respectively show the physical layer architectures of the transmitter with the CDD implemented in the time and frequency domains. Compared with the physical layer structure of the corresponding existing CCD transmitter shown in FIG. 1a and FIG. 1b, the physical layer architecture of the CDD transmitter provided by the present invention adds an antenna permuting means (module) after the cyclic delay means (module) for time delay or phase shift. Without loss of generality, the description makes reference to FIG. 5 and FIG. 7b by way of example.

Similar to the existing CDD transmitter, in the transmitter shown in FIG. 6b, after channel encoding, interleaving and modulation of the initial source bit stream, the modulated symbol, mapped to the m-th sub-carrier of the n-th OFDM symbol, is noted as S(n,m), wherein, m=0, 1, ... N−1 and N is the FFT size. The signal stream composed by S(n,m) is duplicated as four copies of signals to be processed, and each copy enters the cyclic delay processing means, wherein, each branch of signal to be processed is cyclic delay processed using one cyclic delay parameter of $e^{-j2\pi\tau_0/N}$, $e^{-j2\pi\tau_1/N}$, $e^{-j2\pi\tau_2/N}$ and $e^{-j2\pi\tau_3/N}$ (which constitute a cyclic delay parameter vector) respectively. Thus, four branches of signals after cyclic delay processing are obtained, and either of the obtained branches of signal after cyclic delay processing corresponds to the k-th antenna by default, and is noted as $X_k(n,m)$.

Thus, the four branches of signals after cyclic delay processing, generated by the cyclic delay mapping means, are shown in formula (1):

$$\overline{X}(n,m) = \begin{bmatrix} X_1(n,m) \\ X_2(n,m) \\ X_3(n,m) \\ X_4(n,m) \end{bmatrix} = \begin{bmatrix} e^{-j2\pi m\tau_0/N} \\ e^{-j2\pi m\tau_1/N} \\ e^{-j2\pi m\tau_2/N} \\ e^{-j2\pi m\tau_3/N} \end{bmatrix} S(n,m) \quad (1)$$

Then, $\overline{X}(n,m)$ enters the antenna permuting means, so as to realize the concept of the invention. Description is given as follows by reference to FIG. 5:

In step S10, the method judges whether a predefined condition is satisfied. Preferably, the predefined condition comprises at least any one of the following:

Condition 1: the cyclic delay mapping rules currently used expire;

Condition 2: the quality of signals at receivers is below a predefined threshold.

As mentioned above, the correlation of channels is usually dependent on the time-variant transmission environment. Thus, to define an expiration period for the cyclic delay mapping rules, as condition 1, could effectively avoid the significant performance degrade of the system caused by a long time's usage of one single rule. The expiration period according to condition 1 can be implemented by a timer to judge whether the condition 1 is satisfied, which records the time for which one single rule has been used and judges whether the time duration reaches one time duration threshold; and the condition 1 can be judged to be satisfied or not, by a counter to count the number of OFDM symbols transmitted using one single rule and judge whether the number reaches a numeric threshold for symbols. Similarly, due to that the essential goal of the various processing carried out by the transmitter is to help the receiver for better receiving and restoring of the signals, it is preferable to take the quality of signals at the receiver as the standard on whether the cyclic mapping rules should be replaced. Wherein, the quality of signals at the receiver can be measured by the receiver and fed back to the network device where the transmitter is located via controlling channels. In the following part, without loss of generality, condition 1 is taken as an example to describe the judging procedure in step S10.

In an assumption, at one moment after the invention was introduced, the transmitter is carrying out cyclic delay mapping processing to the signals using one cyclic delay mapping rule. Specifically, it is assumed that: the antenna permutation means, shown in FIG. 7a, does not interfere the default mapping relationship between the entering branches of signals after cyclic delay processing and the transmitting antennas, thus the antenna permutation means outputs the four branches of signals, corresponding to the transmitting antennas in the default manner, to the downstream S/P conversion means (module).

In the transmitter shown in FIG. 7a, it is feasible for the antenna permutation means to carry out the judging process in step S10, or for a functional module not shown in the figure to carry out the judging process and to notify the judgment result to the antenna permutation means in time. Wherein, the determining procedure in step S10 repeats preferably every predefined period.

It is assumed that, the judgment result after one execution of step S10 is that: the predefined condition is satisfied, typically this is due to that the currently used cyclic delay mapping rule has gone through for a time equal to its expatriation period since the start of use. Thus, to guarantee that the performance of the system doesn't degrade for a long time's usage of one single cyclic delay mapping rule, it is preferable to update the cyclic relay mapping rule.

In this embodiment, the following 24 permutation matrices have been pre-stored in the transmitter. When it is needed to replace the cyclic relay mapping rule, in the step S11, one is selected from the 24 permutation matrices, thus a new cyclic relay mapping rule in this embodiment is determined:

$$W_1 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, W_2 = \begin{bmatrix} 1 & 0 & 0 & 0 \\ 0 & 1 & 0 & 0 \\ 0 & 0 & 0 & 1 \\ 0 & 0 & 1 & 0 \end{bmatrix}, W_3 = \begin{bmatrix} 1 & 0 & 0 & 0 \\ 0 & 0 & 1 & 0 \\ 0 & 1 & 0 & 0 \\ 0 & 0 & 0 & 1 \end{bmatrix},$$

$$W_4 = \begin{bmatrix} 1 & 0 & 0 & 0 \\ 0 & 0 & 1 & 0 \\ 0 & 0 & 0 & 1 \\ 0 & 1 & 0 & 0 \end{bmatrix}, W_5 = \begin{bmatrix} 1 & 0 & 0 & 0 \\ 0 & 0 & 0 & 1 \\ 0 & 1 & 0 & 0 \\ 0 & 0 & 1 & 0 \end{bmatrix}, W_6 = \begin{bmatrix} 1 & 0 & 0 & 0 \\ 0 & 0 & 0 & 1 \\ 0 & 0 & 1 & 0 \\ 0 & 1 & 0 & 0 \end{bmatrix},$$

$$W_7 = \begin{bmatrix} 0 & 1 & 0 & 0 \\ 1 & 0 & 0 & 0 \\ 0 & 0 & 0 & 1 \\ 0 & 0 & 1 & 0 \end{bmatrix}, W_8 = \begin{bmatrix} 0 & 1 & 0 & 0 \\ 1 & 0 & 0 & 0 \\ 0 & 0 & 0 & 1 \\ 0 & 0 & 1 & 0 \end{bmatrix}, W_9 = \begin{bmatrix} 0 & 1 & 0 & 0 \\ 0 & 0 & 1 & 0 \\ 1 & 0 & 0 & 0 \\ 0 & 0 & 0 & 1 \end{bmatrix},$$

$$W_{10} = \begin{bmatrix} 0 & 1 & 0 & 0 \\ 0 & 0 & 1 & 0 \\ 0 & 0 & 0 & 1 \\ 1 & 0 & 0 & 0 \end{bmatrix}, W_{11} = \begin{bmatrix} 0 & 1 & 0 & 0 \\ 0 & 0 & 0 & 1 \\ 1 & 0 & 0 & 0 \\ 0 & 0 & 1 & 0 \end{bmatrix}, W_{12} = \begin{bmatrix} 0 & 1 & 0 & 0 \\ 0 & 0 & 0 & 1 \\ 0 & 0 & 1 & 0 \\ 1 & 0 & 0 & 0 \end{bmatrix},$$

$$W_{13} = \begin{bmatrix} 0 & 0 & 1 & 0 \\ 0 & 1 & 0 & 0 \\ 1 & 0 & 0 & 0 \\ 0 & 0 & 0 & 1 \end{bmatrix}, W_{14} = \begin{bmatrix} 0 & 0 & 1 & 0 \\ 0 & 1 & 0 & 0 \\ 0 & 0 & 0 & 1 \\ 1 & 0 & 0 & 0 \end{bmatrix}, W_{15} = \begin{bmatrix} 0 & 0 & 1 & 0 \\ 1 & 0 & 0 & 0 \\ 0 & 1 & 0 & 0 \\ 0 & 0 & 0 & 1 \end{bmatrix},$$

$$W_{16} = \begin{bmatrix} 0 & 0 & 1 & 0 \\ 1 & 0 & 0 & 0 \\ 0 & 0 & 0 & 1 \\ 0 & 1 & 0 & 0 \end{bmatrix}, W_{17} = \begin{bmatrix} 0 & 0 & 1 & 0 \\ 0 & 0 & 0 & 1 \\ 0 & 1 & 0 & 0 \\ 1 & 0 & 0 & 0 \end{bmatrix}, W_{18} = \begin{bmatrix} 0 & 0 & 1 & 0 \\ 0 & 0 & 0 & 1 \\ 1 & 0 & 0 & 0 \\ 0 & 1 & 0 & 0 \end{bmatrix},$$

$$W_{19} = \begin{bmatrix} 0 & 0 & 0 & 1 \\ 0 & 1 & 0 & 0 \\ 0 & 0 & 1 & 0 \\ 1 & 0 & 0 & 0 \end{bmatrix}, W_{20} = \begin{bmatrix} 0 & 0 & 0 & 1 \\ 0 & 1 & 0 & 0 \\ 1 & 0 & 0 & 0 \\ 0 & 0 & 1 & 0 \end{bmatrix}, W_{21} = \begin{bmatrix} 0 & 0 & 0 & 1 \\ 0 & 0 & 1 & 0 \\ 0 & 1 & 0 & 0 \\ 1 & 0 & 0 & 0 \end{bmatrix},$$

$$W_{22} = \begin{bmatrix} 0 & 0 & 0 & 1 \\ 1 & 0 & 0 & 0 \\ 0 & 1 & 0 & 0 \\ 0 & 0 & 1 & 0 \end{bmatrix}, W_{23} = \begin{bmatrix} 0 & 0 & 0 & 1 \\ 1 & 0 & 0 & 0 \\ 0 & 0 & 1 & 0 \\ 0 & 1 & 0 & 0 \end{bmatrix}, W_{24} = \begin{bmatrix} 0 & 1 & 0 & 0 \\ 0 & 0 & 0 & 1 \\ 0 & 0 & 1 & 0 \\ 1 & 0 & 0 & 0 \end{bmatrix}$$

Wherein, in each of the permutation matrix, there is only one element equal to 1 while other are 0 in any one row and in any one column.

In step S12, the selected one permutation matrix is used to carry out mapping processing to the signal $\overline{X}$ after cyclic relay processing, according to formula 2:

$$\overline{Y}(n,m) = \begin{bmatrix} Y_0(n,m) \\ Y_1(n,m) \\ Y_2(n,m) \\ Y_3(n,m) \end{bmatrix} = W\overline{X} = W \begin{bmatrix} e^{-j2\pi m\tau_0/N} \\ e^{-j2\pi m\tau_1/N} \\ e^{-j2\pi m\tau_2/N} \\ e^{-j2\pi m\tau_3/N} \end{bmatrix} S(n,m) \qquad (2)$$

Since $w_1$:

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

pre-multiplies $$\begin{bmatrix} e^{-j2\pi m\tau_0/N} \\ e^{-j2\pi m\tau_1/N} \\ e^{-j2\pi m\tau_2/N} \\ e^{-j2\pi m\tau_3/N} \end{bmatrix}$$

(a cyclic delay parameter vector) and the result is still $$\begin{bmatrix} e^{-j2\pi m\tau_0/N} \\ e^{-j2\pi m\tau_1/N} \\ e^{-j2\pi m\tau_2/N} \\ e^{-j2\pi m\tau_3/N} \end{bmatrix},$$

based on the previous assumption, it can be deemed that in the cyclic delay mapping rules, $w_1$ is used to carry out mapping processing to $\overline{X}$, so as to map $e^{-j2\pi\tau_0/N} \cdot S(n,m)$ to antenna TX_1, map $e^{-j2\pi\tau_1/N} \cdot S(n,m)$ to antenna TX_2, map $e^{-j2\pi\tau_2/N} \cdot S(n,m)$ to antenna TX_3 and map $e^{-j2\pi\tau_3/N} \cdot S(n,m)$ to antenna TX_4.

Thus, in step S11, a permutation matrix, different from $w_1$, should be selected to carry out the mapping processing. The selection procedure can be done by selecting the above permutation matrix sequentially according to the index number, that is, after the permutation matrix $w_r$ has expired, the permutation matrix $w_{r+1}$ will be selected automatically. Without the loss of generality, it is assumed that $w_2$ is selected in step S11.

Then, in the following step S12, $w_2$ is used to pre-multiply $\overline{X}$ according to formula 2. Thus, $e^{-j2\pi\tau_0/N} \cdot S(n,m)$ is mapped to antenna TX_1, $e^{-j2\pi\tau_1/N} \cdot S(n,m)$ is mapped to antenna TX_2, $e^{-j2\pi\tau_3/N} \cdot S(n,m)$ is mapped to antenna TX_3 and $e^{-j2\pi\tau_2/N} \cdot S(n,m)$ is mapped to antenna TX_4.

Compared to the prior art, the signal after cyclic delay processing by $e^{-j2\pi\tau_2/N}$, which was always transmitted by antenna TX_3, is switched to be transmitted by antenna TX_4; and the signal after cyclic delay processing by $e^{-j2\pi\tau_3/N}$, which was always transmitted by antenna TX_4, is switched to be transmitted by antenna TX_3, and these help to maintain the system performance as the time goes by.

It is to be noted that, since the procedures of channel encoding, interleaving and modulating are not influenced by the introduction of the invention or not, they are shown in one means (module) or omitted in the figures for simplicity. Those skilled in the art should understand that the above simplification or omitting doesn't influence the description of the invention essentially.

In a varied embodiment, wherein, multiple cyclic delay mapping parameters $\{\tau_0, \tau_1, \tau_2, \tau_3, \ldots, \tau_x\}$ are pre-stored in the CDD transmitter. When the judgment result in step S10 indicates that the predefined condition is satisfied, the transmitter selects at least one cyclic delay parameter from the multiple cyclic delay mapping parameters according to a predefined regulation or just randomly, and replaces at least one element in the cyclic delay parameters vector used in the last cyclic delay mapping rule, such as to replace $$\begin{bmatrix} e^{-j2\pi m\tau_0/N} \\ e^{-j2\pi m\tau_1/N} \\ e^{-j2\pi m\tau_2/N} \\ e^{-j2\pi m\tau_3/N} \end{bmatrix} \text{ by } \begin{bmatrix} e^{-j2\pi m\tau_4/N} \\ e^{-j2\pi m\tau_5/N} \\ e^{-j2\pi m\tau_6/N} \\ e^{-j2\pi m\tau_7/N} \end{bmatrix}.$$

In the following step S12 (in the cyclic delay module shown in the figure), the transmitter uses $$\begin{bmatrix} e^{-j2\pi m\tau_4/N} \\ e^{-j2\pi m\tau_5/N} \\ e^{-j2\pi m\tau_6/N} \\ e^{-j2\pi m\tau_7/N} \end{bmatrix}$$

to carry out the cyclic delay processing to the four branches of signals to be processed (S(n,m)), and obtains four branches of signals after cyclic delay processing $e^{-j2\pi\tau_4/N} \cdot S(n,m)$, $e^{-j2\pi\tau_5/N} \cdot S(n,m)$, $e^{-j2\pi\tau_6/N} \cdot S(n,m)$ and $e^{-j2\pi\tau_7/N} \cdot S(n,m)$ which respectively corresponds to TX_1, TX_2, TX_3 and TX_4 by default. Here, the antenna permutation module could either select a permutation matrix from $w_2$-$w_{24}$ to interfere the relationships between the branches of signals and the transmitting antenna, or transmits these branches of signals via corresponding antennas according to the default relationships.

In the varied embodiment, optionally, instead of pre-storing the multiple cyclic delay mapping parameters, the method could determine the new cyclic delay mapping rules through replacing the currently used cyclic delay parameters by at least one cyclic delay parameter, which is generated in real-time by the transmitter through applying predefined algorithms to some specific parameters such as time and channel-related information.

In the above part, the CDD system, especially the CDD transmitter, according to the invention has been elucidated. In the following part, the CDD+STBC system, especially the CDD+STBC transmitter based on the same invention concept will be described with reference to FIG. 5 in conjunction with FIG. 7.

Figure 7:
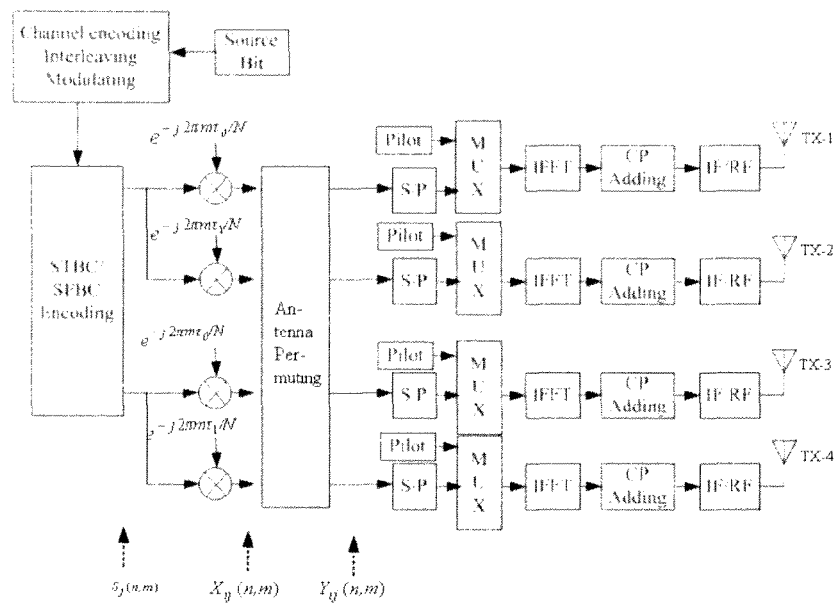
FIG. 7 shows the physical layer architecture of the transmitter of the CDD+STBC according to a detailed embodiment of the present invention.

FIG. 7 shows a physical layer structure of a CDD+STBC transmitter according to an embodiment of the present invention.

In the shown CDD+STBC transmitter, after channel encoding, interleaving and modulation of the initial source bit stream, the obtained modulated symbol flow S(n,m) enters the STBC encoding module for space-time encoding, wherein the STBC encoded symbol on the m-th subcarrier of the n-th OFDM symbol is denoted as $S_j(n,m)$, j=0, 1, which corresponds to the two branches encoded symbols output by the corresponding STBC encoding module.

The two branches of STBC encoded symbols enter the cyclic delay module, and four branches of signals after cyclic delay processing as follows are obtained:

$$\overline{X}(n,m) = \begin{bmatrix} e^{-j2\pi m\tau_0/N} & 0 \\ e^{-j2\pi m\tau_1/N} & 0 \\ 0 & e^{-j2\pi m\tau_0/N} \\ 0 & e^{-j2\pi m\tau_1/N} \end{bmatrix} \begin{bmatrix} S_0(n,m) \\ S_1(n,m) \end{bmatrix} \quad (3)$$

$$= \begin{bmatrix} S_0(n,m)e^{-j2\pi m\tau_0/N} \\ S_0(n,m)e^{-j2\pi m\tau_1/N} \\ S_1(n,m)e^{-j2\pi m\tau_0/N} \\ S_1(n,m)e^{-j2\pi m\tau_1/N} \end{bmatrix}$$

When the predetermined condition in step S10 is satisfied, any one of above-mentioned pre-stored 24 permutation matrices is chosen to carry out the mapping processing shown in formula (4):

$$\overline{Y}(n,m) = \begin{bmatrix} Y_0(n,m) \\ Y_1(n,m) \\ Y_2(n,m) \\ Y_3(n,m) \end{bmatrix} \quad (4)$$

$$= W\overline{X}(n,m)$$

$$= W \begin{bmatrix} e^{-j2\pi m\tau_0/N} & 0 \\ e^{-j2\pi m\tau_1/N} & 0 \\ 0 & e^{-j2\pi m\tau_0/N} \\ 0 & e^{-j2\pi m\tau_1/N} \end{bmatrix} \begin{bmatrix} S_0(n,m) \\ S_1(n,m) \end{bmatrix}$$

Still it is supposed that $w_2$ is chosen for carrying out the mapping processing, then, formula (4) can be represented by formula (5):

$$\overline{Y}(n,m) = \begin{bmatrix} Y_0(n,m) \\ Y_1(n,m) \\ Y_2(n,m) \\ Y_3(n,m) \end{bmatrix} \quad (5)$$

$$= W_2\overline{X}(n,m)$$

$$= \begin{bmatrix} 1 & 0 & 0 & 0 \\ 0 & 1 & 0 & 0 \\ 0 & 0 & 0 & 1 \\ 0 & 0 & 1 & 0 \end{bmatrix} \begin{bmatrix} e^{-j2\pi m\tau_0/N} & 0 \\ e^{-j2\pi m\tau_1/N} & 0 \\ 0 & e^{-j2\pi m\tau_0/N} \\ 0 & e^{-j2\pi m\tau_1/N} \end{bmatrix} \begin{bmatrix} S_0(n,m) \\ S_1(n,m) \end{bmatrix}$$

Figure 8:
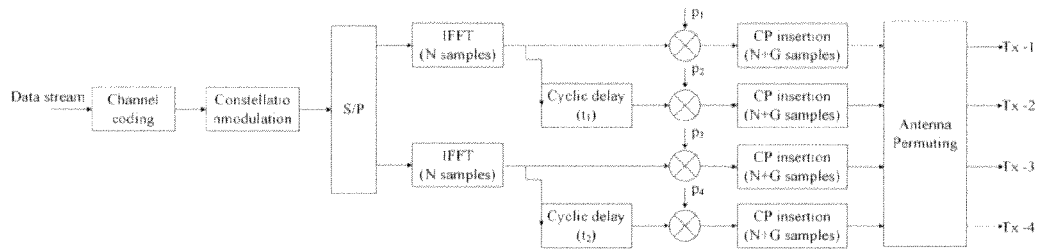
FIG. 8 shows the physical layer architecture of the transmitter of the CDD+SM according to a detailed embodiment of the present invention.

From FIG. 8, it can be seen that, before the processing of the antenna permutation module, the default corresponding relationships between the signals after cyclic delay processing and the transmission antennas are: $e^{-j2\pi\tau_0/N} \cdot S_0(n,m) \rightarrow$ antenna TX_1; $e^{-j2\pi\tau_1/N} \cdot S_0(n,m) \rightarrow$ antenna TX_2; $e^{-j2\pi\tau_0/N} \cdot S_1(n,m) \rightarrow$ antenna TX_3; $e^{-j2\pi\tau_1/N} \cdot S_1(n,m) \rightarrow$ antenna TX_4.

Then, after the processing by the antenna permutation module, the corresponding relationships between each branch of signal and the antenna change to: $e^{-j2\pi\tau_0/N} \cdot S(n,m) \rightarrow$ antenna TX_1; $e^{-j2\pi\tau_1/N} \cdot S_0(n,m) \rightarrow$ antenna TX_2; $e^{-j2\pi\tau_1/N} \cdot S_1(n,m) \rightarrow$ antenna TX_3; $e^{-j2\pi\tau_0/N} \cdot S_1(n,m) \rightarrow$ antenna TX_4.

According to a varied embodiment based on the embodiment shown in FIG. 7, the CDD+STBC transmitter pre-stores a plurality of cyclic delay mapping parameters $\{\tau_0, \tau_1, \tau_2, \tau_3, \ldots, \tau_x\}$. When the determining resulting in step S10 indicates that the predetermined condition is satisfied, the transmitter chooses at least one cyclic delay parameter from the pre-stored plurality of cyclic delay mapping parameters according to a predetermined rule or just randomly, and uses the chosen at least one parameter to replace at least one element in the cyclic delay parameters vector used in the last cyclic delay mapping rule, such as to replace $\tau_0$ by $\tau_j$, and $\tau_1$ by $\tau_k$.

In the following step S12 (in the cyclic delay module shown in the figure), the transmitter carries out the cyclic delay processing to the signals to be processed, and the corresponding formula (3) changes to:

$$\overline{X}'(n,m) = \begin{bmatrix} e^{-j2\pi m\tau_j/N} & 0 \\ e^{-j2\pi m\tau_k/N} & 0 \\ 0 & e^{-j2\pi m\tau_j/N} \\ 0 & e^{-j2\pi m\tau_k/N} \end{bmatrix} \begin{bmatrix} S_0(n,m) \\ S_1(n,m) \end{bmatrix} \quad (6)$$

$$= \begin{bmatrix} S_0(n,m)e^{-j2\pi m\tau_j/N} \\ S_0(n,m)e^{-j2\pi m\tau_k/N} \\ S_1(n,m)e^{-j2\pi m\tau_j/N} \\ S_1(n,m)e^{-j2\pi m\tau_k/N} \end{bmatrix}$$

Then, the antenna permutation module could either select a permutation matrix from $w_2$-$w_{24}$ to interfere the relationships between the branches of signals and the transmitting antennas, or transmit these branches of signals via corresponding antennas according to the default relationships, which depends on the determining of the new cyclic delay mapping rules, and the determining principle for the new cyclic delay mapping rules can be preset automatically or manually.

In the varied embodiment, optionally, instead of pre-storing the multiple cyclic delay mapping parameters, the method could determine the new cyclic delay mapping rules through replacing the currently used cyclic delay parameters by at least one cyclic delay parameter, which is generated in real-time by the transmitter through applying predefined algorithms to some specific parameters such as time and channel-related information.

Figure 9:
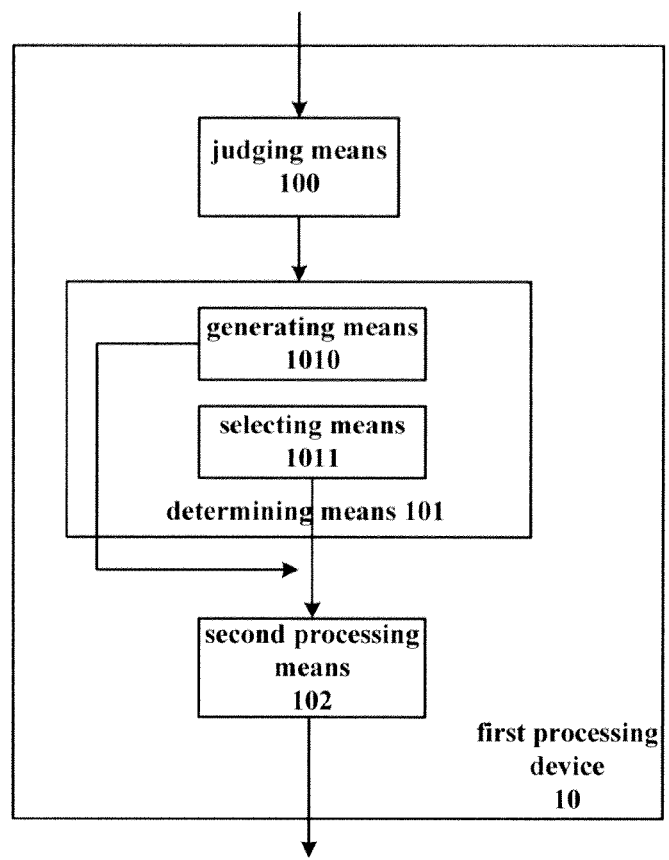
FIG. 9 shows the block diagram of a first processing device, in the multi-antenna transmitter in a multi-carrier modulation based network device, for carrying out cyclic delay processing for the signal according to a detailed embodiment of the present invention.

Base on the same invention concept, references are made to FIG. 5 in combination with FIG. 9 to introduce the CDD+SM system, and particular to the CDD+SM transmitter therein.

FIG. 8 shows a physical layer structure of a CDD+SM transmitter according to an embodiment of the present invention, In the shown CDD+SM transmitter, after channel encoding, interleaving and modulation of the initial source bit stream, the obtained modulated symbol is denoted as $S_z$ ($z=1, 2, \ldots Z$).

After S/P conversion to the modulated symbol stream $S_z$, a first branch of signals [S1, S3, ..., S2$k$+1, ...] and a second branch of signals [S2, S4, ..., S2$k$, ...] are generated. The first pair of modulated symbols after P/S conversion S1 (which belong to the first branch of signals) and S2 (which belong to the second branch of signals) is taken as an example. After being copied and processed through the cyclic delay processing shown in the figure, the obtained four symbols after cyclic delay processing are shown in the form of matrix:

$$\begin{bmatrix} s_1 \\ s_2 \\ e^{j\theta_1}s_1 \\ e^{j\theta_2}s_2 \end{bmatrix}$$

wherein $\theta_j = 2\pi k\tau_i/N$, N is the size of FFT transform, k is the index for the subcarrier, and $\tau_i$ (i=1, 2) is the cyclic delay parameter used by the i-th branch of signals after S/P conversion. Prior to the introduction of the present invention, each pair of modulated symbols after S/P conversion is mapped to the four transmitting antennas according to the following format:

$$\begin{bmatrix} s_1 \\ s_2 \\ e^{j\theta_1}s_1 \\ e^{j\theta_2}s_2 \end{bmatrix},$$

that is: the first branch of signals without cyclic delay (or equivalent to the fact that the cyclic delay parameter $\tau$ equals to 0) is sent by the transmitting antenna TX_1; the second branch of signals without cyclic delay (or equivalent to the fact that the cyclic delay parameter $\tau$ equals to 0) is sent by the transmitting antenna TX_2; the first branch of signal after cyclic delay processing with $\theta_1$ is sent by the transmitting antenna TX_3; and the second branch of signals after cyclic delay processing with $\theta_2$ is sent by the transmitting antenna TX_4.

With the present invention, with the aid of the introduction of the antenna permutation module into the CDD+SM transmitter, the obtained output matrix is shown as the following formula (7):

$$S_{CDD+SM\_out} = [S_{CDD+SM\_out\_1}\ S_{CDD+SM\_out\_2}] \quad (7)$$

Wherein, the $S_{CDD+SM\_out\_1}$ and $S_{CDD+SM\_out\_2}$ in formula (7) can be represented as formula (8) and (9) respectively:

$$S_{CDD+SM\_out\_1} = \begin{bmatrix} s_1 & s_3 & s_5 & s_7 & s_9 & s_{11} \\ s_2 & s_4 & e^{j\theta_1}s_5 & e^{j\theta_2}s_8 & e^{j\theta_1}s_9 & e^{j\theta_2}s_{12} \\ e^{j\theta_1}s_1 & e^{j\theta_2}s_4 & s_6 & s_8 & e^{j\theta_2}s_{10} & e^{j\theta_1}s_{11} \\ e^{j\theta_2}s_2 & e^{j\theta_1}s_3 & e^{j\theta_2}s_6 & e^{j\theta_1}s_7 & s_{10} & s_{12} \end{bmatrix} \quad (8)$$

$$S_{CDD+SM\_out\_2} = \begin{bmatrix} e^{j\theta_1}s_{13} & e^{j\theta_1}s_{15} & e^{j\theta_1}s_{17} & e^{j\theta_1}s_{19} & e^{j\theta_1}s_{21} & e^{j\theta_1}s_{23} \\ s_{14} & s_{16} & s_{17} & e^{j\theta_2}s_{20} & s_{21} & e^{j\theta_2}s_{24} \\ s_{13} & e^{j\theta_2}s_{16} & s_{18} & s_{20} & e^{j\theta_2}s_{22} & s_{23} \\ e^{j\theta_2}s_{14} & s_{15} & e^{j\theta_2}s_{18} & s_{19} & s_{22} & s_{24} \end{bmatrix} \quad (9)$$

In could be seen that with the introduction of the present invention, the cyclic delay parameters used by the signals sent via the four transmitting antennas change continuously, therefore the deterioration of the system performance with the passing of time is avoided.

Similarly, in the CDD+SM system, the cyclic delay parameters can be changed periodically/non-periodically for updating the cyclic delay mapping rules.

The CDD transmitter, CDD+STBC transmitter and the CDD+SM transmitter are introduced above.

After the introduction of the present invention, the existing receiver is not influenced and can support the present invention very well. For the ease of understanding, the CDD+SM transmitter is taken as an example to briefly describe the working principle:

The receiver estimates the channel frequency response (CFR) denoted by H, with the help of pilot symbols. Then, the receiver can detect the received signals based on the minimum mean square error (MMSE) or the maximum likelihood (ML) criteria. Taking ML as an example, the ML detector uses the following decision metric shown in formula (10):

$$\min_{s_1 \in \mathcal{R}_1, s_2 \in \mathcal{R}_2} \left\| y - H \begin{bmatrix} s_1 \\ s_2 \end{bmatrix} \right\|^2 \quad (10)$$

wherein y is the received signal vector, $\mathcal{R}_i$ is the constellation set that $s_i$ belongs to, and $\|x\|^2 = x^*x$ is the squared Euclidean norm.

In the following part, a first processing device, in the multi-antenna transmitter in a multi-carrier modulation based network device, for carrying out cyclic delay processing for the signal will be described by reference to FIG. 10.

The first device 10 shown in FIG. 9 comprises: a judging means 100, a determining means 101 and a second processing means 102. To be specific, the determining means 101 comprises a generating means 1010 and a selecting means 1011.

The judging means 100 is responsible for preferably judges periodically whether the predetermined condition is satisfied. According to a non-limiting embodiment of the present invention, the predetermined condition is the previous cyclic delay mapping rule expires.

To be specific, the judging means 100 can comprise a timer, and the timer starts to time from the moment that the previous cyclic delay mapping rule starts to be used for carrying out cyclic delay mapping processing on the signal. When the elapsed time has reached a time duration threshold, the judging means 100 outputs a judgment result, which indicates that the predetermined condition is satisfied.

The judgment result is provided to the determining means 101. In the determining means 101, a new cyclic delay mapping rule is determined which is different from the currently used cyclic delay mapping rule, and the new rule is provided to the second determining means 102. Wherein, the difference between the new cyclic delay mapping rule and the previously used cyclic delay mapping rule reflects in that:

only the cyclic delay mapping vectors used for carrying out cyclic delay processing on the signals to be processed are different;

only the mapping manners used for mapping the multiple branches of signals after cyclic delay processing are different;

not only the cyclic delay mapping vectors used for carrying out cyclic delay processing on the signals to be processed are different, but also the mapping manners used for mapping the multiple branches of signals after cyclic delay processing are different.

According to a non-limiting embodiment, the generating means 1010 in the determining means 101 generates a second cyclic delay mapping vectors different from the first cyclic delay mapping vectors currently used by the cyclic delay mapping rule, and the selecting means 1011 selects, from a plurality of mapping manners, a second mapping manner different from the first mapping manner used by currently used cyclic delay mapping rule. Thus the new cyclic delay mapping rule is determined.

After the determined cyclic delay mapping rule is notified to the second processing means 102, the second processing means 102 carries out the processing on the signals based on the determined new cyclic delay mapping rule, so as to generate a plurality branches of signals after cyclic delay mapping processing.

In combination with the description of the simulation figures, the technical effects of the present invention will become obvious. Table 1 shows the simulation conditions.

TABLE 1

| Simulation Conditions | |
| --- | --- |
| Parameter | Assumption |
| OFDM parameters | Carrier frequency = 3.5 GHz |
|  | Sampling frequency = 11.424 MHz |
|  | FFT size = 1024; CP length = 128 samples |
|  | Used subcarriers = 841 subcarriers |
| Channel model | 3GPP SCME - Urban Micro |
| Mobile speed | 30 kmph |
| Channel code | Convolutional code, code rate = ½ |
| Modulation scheme | 16QAM |
| Antenna configuration | 4 transmitter with antenna spacing of {0.5λ, 4λ} |
|  | 2 receiver with antenna spacing of 0.5λ |
| Channel estimation | Perfect channel estimation |
| Delay samples for CDD | $\tau_0 = 0$, $\tau_1 = 20$, $\tau_2 = 40$, $\tau_3 = 60$ samples for CDD |
|  | $\tau_0 = 0$, $\tau_1 = 64$ samples for CDD + STBC |
|  | $\tau_0 = 64$, $\tau_1 = 64$ samples for CDD + SM |

Figure 10A:
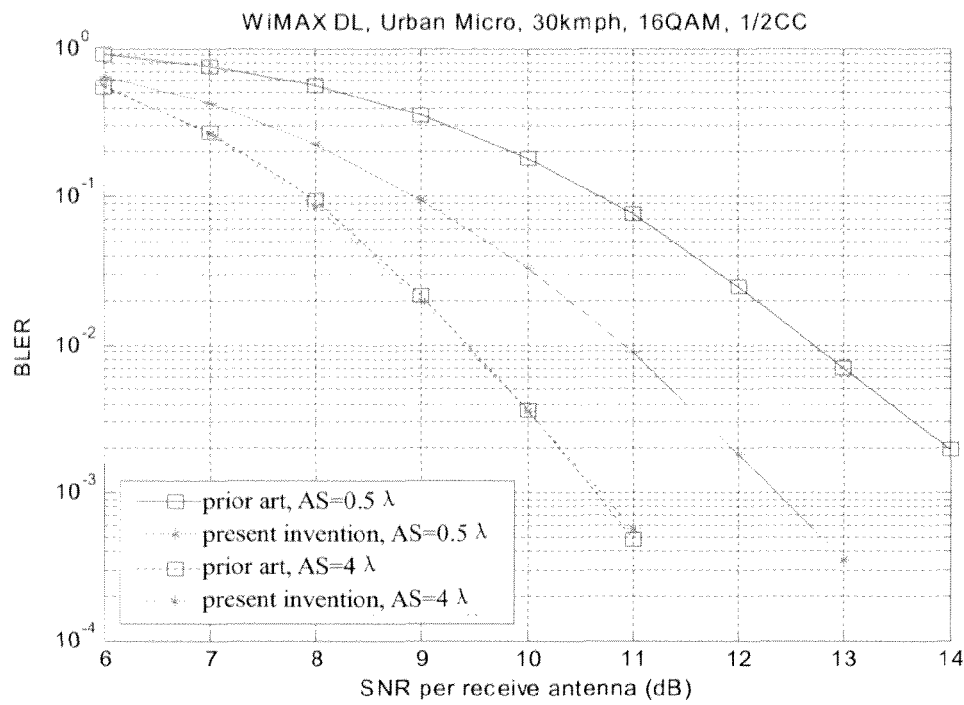
FIG. 10a shows the comparison diagram of the performance of the CDD system based on the present invention compared with that based on the prior art.

FIG. 10a presents the figures of the performance comparison of the existing CDD scheme and the invented CDD scheme. Wherein, the vertical axis represents the block-error-ratio (BLER), while the horizontal axis represents the Signal-to-Noise Ratio (SNR) per each receiving antenna. Simulation results in the FIG. 10 clearly verifies that, in independent or weakly correlated channels (corresponding to antenna element spacing of 4λ), the new scheme has almost the same performance as the conventional existing CDD scheme. But for correlated channels (corresponding to antenna element spacing of 0.5λ), the new scheme achieves an additional gain of about 1.8 dB at the BLER of 0.01 over the prior art. This result shows that the invented CDD scheme is more robust than the existing CDD scheme in case of spatial correlation.

Figure 10B:
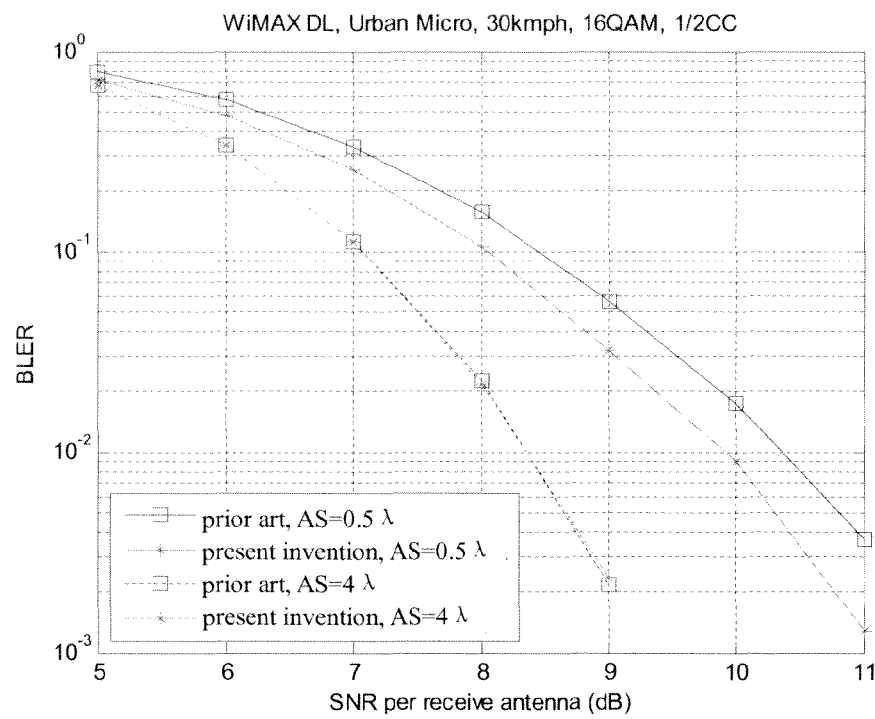
FIG. 10b shows the comparison diagram of the performance of the CDD+STBC system based on the present invention compared with that based on the prior art.

FIG. 10b presents the figure of the performance comparison of the existing STBC+CDD scheme and the invented STBC+CDD scheme. It is obvious that, in independent or weakly correlated channels (corresponding to antenna element spacing of 4λ), the new scheme has almost the same performance as the conventional existing scheme. But for correlated channels (corresponding to antenna element spacing of 0.5λ), the new scheme achieves an additional gain of about 0.5 dB at the BLER of 0.01 over the prior art. This result shows that the invented CDD scheme is more robust to spatial correlation than the existing CDD scheme in case of spatial correlation.

Figure 10C:
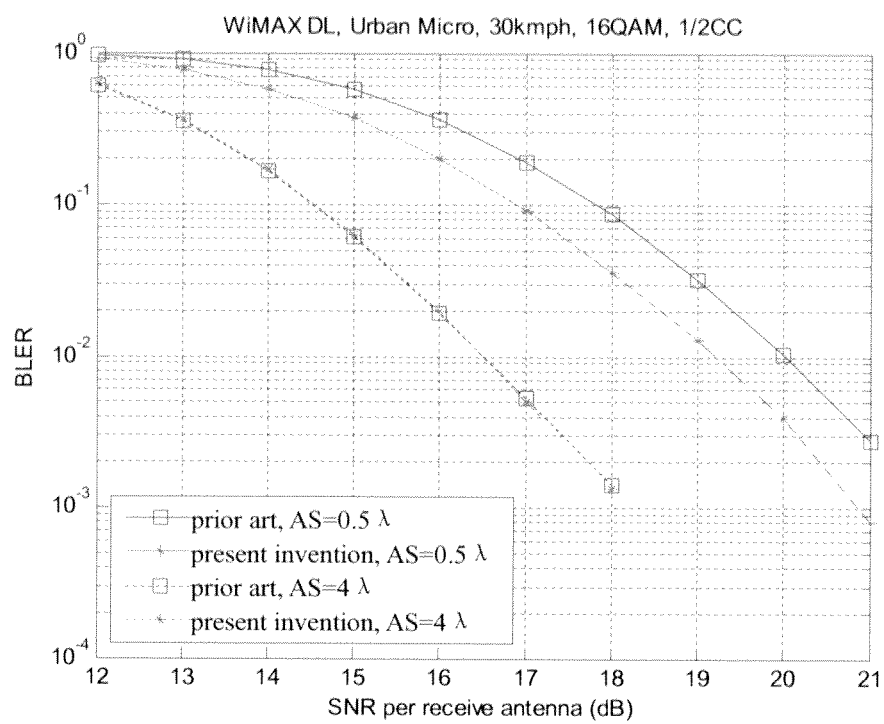
FIG. 10c shows the comparison diagram of the performance of the CDD+SM system based on the present invention compared with that based on the prior art.

FIG. 10c shows the figure of the comparison performances of the conventional CDD+SM scheme and the invented CDD+SM scheme. From the FIG. 10c, we can see that for independent or weakly correlated channels (corresponding to antenna element spacing of 4λ), the new scheme has almost the same performance as the conventional combined CDD/SM scheme, but for correlated channels (corresponding to antenna element spacing of 0.5λ), the new scheme achieves an additional gain of about 0.8 dB at the BLER of 0.01 over the prior art. This result shows that the invented scheme works more robustly against spatial correlation compared with the existing technique.

Although the preferable embodiments of the present invention have been described above, the protection scope of the invention is not limited by them. Easy modifications can be made by those skilled in the art without departing from the scope and spirit of the present invention, and all these modifications should be deemed as within the protection scope of the invention. Thus, the protection scope of the invention shall be determined by the protection scope of the claims.

What is claimed is:

1. A method, in a multiple-antenna transmitter, of carrying out cyclic delay mapping processing on signals, the method comprising:
    judging iteratively whether a predefined condition is satisfied;
    in case that the predefined condition is satisfied, processing multiple branches of signals to be processed with new cyclic delay mapping rules, so as to generate multiple branches of signals after cyclic delay mapping processing corresponding to the multiple transmitting antennas of said transmitter respectively; and
    in case that the predefined condition is not satisfied, processing the multiple branches of signals to be processed with cyclic delay mapping rules currently used, so as to generate multiple branches of signals after cyclic delay mapping processing corresponding to the multiple transmitting antennas of said transmitter respectively,
    wherein the cyclic delay mapping rules currently used include:
    carrying out cyclic delay processing on the multiple branches of signals to be processed with a first cyclic delay parameter vector, so as to generate multiple branches of signals after cyclic delay processing, and mapping the multiple branches of signals after cyclic delay processing to the multiple transmitting antennas based on a first mapping manner, so as to generate multiple branches of signals after cyclic delay mapping processing corresponding to the multiple transmitting antennas respectively;
    thereby generating multiple branches of signals after cyclic delay mapping processing corresponding to the multiple transmitting antennas of said transmitter respectively.

2. The method according to claim 1, wherein said predefined condition comprises at least any one of:
    the cyclic delay mapping rules currently used expire;
    the quality of signals received by corresponding receivers from the present transmitter is below a predefined level.

3. The method according to claim 1, wherein after the judging and before the processing, the method comprises:
    in case that the predefined condition is satisfied, determining the new cyclic delay mapping rules;
    and the processing further comprises:
    processing the multiple branches of signals to be processed corresponding to said multiple transmitting antennas with the determined new cyclic delay mapping rules, so as to generate multiple branches of signals after cyclic delay mapping processing corresponding to the multiple transmitting antennas of said transmitter respectively.

4. The method according to claim 1 wherein the new cyclic delay mapping rules comprises at least any one of the following rules:
    rule i: processing the multiple branches of signals to be processed with a second delay parameter vector, so as to generate multiple branches of signals after cyclic delay processing, and mapping the multiple branches of signals after cyclic delay processing to the multiple transmitting antennas based on the first mapping manner, so as to generate multiple branches of signals after cyclic delay mapping processing corresponding to the multiple transmitting antennas respectively;

rule ii: processing the multiple branches of signals to be processed with the first delay parameter vector, so as to generate multiple branches of signals after cyclic delay processing, and mapping the multiple branches of signals after cyclic delay processing to the multiple transmitting antennas based on a second mapping manner, so as to generate multiple branches of signals after cyclic delay mapping processing corresponding to the multiple transmitting antennas respectively;

rule iii: processing the multiple branches of signals to be processed with a second delay parameter vector, so as to generate multiple branches of signals after cyclic delay processing, and mapping the multiple branches of signals after cyclic delay processing to the multiple transmitting antennas based on a second mapping manner, so as to generate multiple branches of signals after cyclic delay mapping processing corresponding to the multiple transmitting antennas respectively.

5. The method according to claim 4, in case that the new cyclic delay mapping rules comprises the rule i and/or iii, wherein said determining comprises:

generating the second delay parameter vector;

and, in case that the new cyclic delay mapping rules comprises the rule ii and/or iii, said determining comprises:

selecting one mapping manner as the second mapping manner, from multiple pre-stored mapping manners.

6. The method according to claim 5, wherein the generating comprises:

permuting at least two elements in the first delay parameter vector, so as to generate the second delay parameter vector or the generating comprises the:

selecting at least one delay parameter from multiple pre-stored delay parameters to replace the at least one delay parameter in the first delay parameter vector, so as to generate the second delay parameter vector.

7. A first processing device, in a multiple antenna transmitter, for carrying out cyclic delay mapping processing on signals, said first processing device comprising:

a condition evaluator, configured to judge whether a predefined condition is satisfied;

a second processor, configured to, in case that the predefined condition is satisfied, process multiple branches of signals to be processed with new cyclic delay mapping rules, so as to generate multiple branches of signals after cyclic delay mapping processing corresponding to the multiple transmitting antennas of said transmitter respectively;

wherein the second processor is configured to, in case that the predefined condition is not satisfied, process the multiple branches of signals to be processed with cyclic delay mapping rules currently used, so as to generate multiple branches of signals after cyclic delay mapping processing corresponding to the multiple transmitting antennas of said transmitter respectively, wherein the cyclic delay mapping rules currently used includes:

carrying out cyclic delay processing on the multiple branches of signals to be processed with a first cyclic delay parameter vector, so as to generate multiple branches of signals after cyclic delay processing, and mapping the multiple branches of signals after cyclic delay processing to the multiple transmitting antennas based on a first mapping manner, so as to generate multiple branches of signals after cyclic delay mapping processing corresponding to the multiple transmitting antennas respectively;

whereby said first processing device generates multiple branches of signals after cyclic delay mapping processing corresponding to the multiple transmitting antennas of said transmitter respectively.

8. The first processing device according to claim 7, wherein said predefined condition comprises at least any one of the following:

the cyclic delay mapping rules currently used expire;

the quality of signals received by corresponding receiver from the present transmitter is below a predefined level.

9. The first processing device according to claim 7 wherein the device further comprises:

a determiner, configured to, in case that the predefined condition is satisfied, determine the new cyclic delay mapping rules;

and the second processor is further configured to process the multiple branches of signals to be processed corresponding to said multiple transmitting antennas with the determined new cyclic delay mapping rules, so as to generate multiple branches of signals after cyclic delay mapping processing corresponding to the multiple transmitting antennas of said transmitter respectively.

10. The first processing device according to claim 7 wherein the new cyclic delay mapping rules comprises at least any one of the following rules:

rule i: processing the multiple branches of signals to be processed with a second delay parameter vector, so as to generate multiple branches of signals after cyclic delay processing, and mapping the multiple branches of signals after cyclic delay processing to the multiple transmitting antennas based on the first mapping manner, so as to generate multiple branches of signals after cyclic delay mapping processing corresponding to the multiple transmitting antennas respectively;

rule ii: processing the multiple branches of signals to be processed with the first delay parameter vector, so as to generate multiple branches of signals after cyclic delay processing, and mapping the multiple branches of signals after cyclic delay processing to the multiple transmitting antennas based on a second mapping manner, so as to generate multiple branches of signals after cyclic delay mapping processing corresponding to the multiple transmitting antennas respectively;

rule iii: processing the multiple branches of signals to be processed with a second delay parameter vector, so as to generate multiple branches of signals after cyclic delay processing, and mapping the multiple branches of signals after cyclic delay processing to the multiple transmitting antennas based on a second mapping manner, so as to generate multiple branches of signals after cyclic delay mapping processing corresponding to the multiple transmitting antennas respectively.

11. The first processing device according to claim 10, in case that the new cyclic delay mapping rules comprises the rule i and/or iii, wherein said determining means comprises:

a vector parameter generator, configured to generate the second delay parameter vector;

and, in case that the new cyclic delay mapping rules comprises the rule ii and/or iii, said determining means comprises:

a selector, configured to select one mapping manner as the second mapping manner, from multiple pre-stored mapping manners.

12. The first processing device according to claim 11, wherein the vector parameter generator is further configured to permute at least two elements in the first delay parameter vector, so as to generate the second delay parameter vector or the generating means is further configured to select at least one delay parameter from multiple pre-stored delay parameters to replace the at least one delay parameter in the first delay parameter vector, so as to generate the second delay parameter vector.

13. The first processing device according to claim 7 implemented in a multi-antenna transmitter, wherein the transmitter comprises the first processing device for carrying out cyclic delay mapping processing on signals.

* * * * *